United States Patent
Subbalakshmi et al.

(10) Patent No.: US 7,529,384 B2
(45) Date of Patent: May 5, 2009

(54) ROBUST HIDDEN DATA EXTRACTION METHOD FOR SCALING ATTACKS

(75) Inventors: Koduvayur P. Subbalakshmi, Holmdel, NJ (US); Palak K. Amin, Edison, NJ (US)

(73) Assignee: The Trustees of Stevens Institute of Technology, Hoboken, NJ (US)

( * ) Notice: Subject to any disclaimer, the term of this patent is extended or adjusted under 35 U.S.C. 154(b) by 542 days.

(21) Appl. No.: 11/200,866

(22) Filed: Aug. 10, 2005

(65) Prior Publication Data

US 2006/0176299 A1    Aug. 10, 2006

Related U.S. Application Data

(60) Provisional application No. 60/600,578, filed on Aug. 11, 2004.

(51) Int. Cl.
  *G06K 9/00* (2006.01)
  *H04L 9/00* (2006.01)
(52) U.S. Cl. .................. 382/100; 382/250; 713/176
(58) Field of Classification Search ............. 382/100, 382/103, 106, 112, 116, 123, 135–138, 155, 382/162, 164, 168, 169, 171, 175, 181, 190, 382/194, 203, 220, 232, 237, 250, 255, 240, 382/274, 285, 298, 305; 713/176, 172, 178
  See application file for complete search history.

(56) References Cited

U.S. PATENT DOCUMENTS

| | | | |
|---|---|---|---|
| 6,714,683 B1 * | 3/2004 | Tian et al. | 382/240 |
| 7,055,037 B2 * | 5/2006 | Hsia et al. | 713/176 |
| 7,376,242 B2 * | 5/2008 | Bradley et al. | 382/100 |
| 7,389,420 B2 * | 6/2008 | Tian | 713/176 |
| 2004/0001608 A1 * | 1/2004 | Rhoads | 382/100 |

FOREIGN PATENT DOCUMENTS

EP   1 164 543 A2   12/2001

OTHER PUBLICATIONS

J.R. Hernandez, et al., "DCT-Domain Watermarking Techniques for Still Images: Detector II Performance Analysis and a New Structure," IEEE Trans. on Image Processing, vol. 9., No. 1, pp. 55-68, Jan. 2000.*

(Continued)

*Primary Examiner*—Seyed Azarian
(74) *Attorney, Agent, or Firm*—Greenberg Traurig, LLP

(57) ABSTRACT

A product and process for extracting hidden data from a stego-image that has been subjected to scaling attacks are disclosed. The hidden data extraction method of the present invention retains the one-to-one mapping of the stego-image blocks to the corresponding blocks in the scaled image. When the stego-image is scaled down, the block size for extracting the hidden data is reduced proportionally. When the stego-image is scaled up, the block size for extracting the hidden data is increased proportionally. The total overall number of blocks of pixels to be examined is kept constant between the scaled image and the stego-image. The hidden data extraction method can be combined with any existing block-DCT based data hiding method to provide an overall method for dealing with scaling attacks. Both the extraction method and the combined method can be implemented in software and stored within a machine-readable medium.

19 Claims, 9 Drawing Sheets

OTHER PUBLICATIONS

J.R. Hernandez, et al., "DCT-Domain Watermarking Techniques for Still Images: Detector Performance Analysis and a New Structure," IEEE Trans. on Image Processing, vol. 9., No. 1, pp. 55-68, Jan. 2000.

M. Mansour and A. Tewfik, "Techniques for Data Embedding Images Using Wavelet Extrema," Proc. SPIE on Security and Watermarking of Multimedia Contents, San Jose, CA, Jan. 2001.

I. Cox, J. Kilian, T. Leighton and T. Shamoon, "Secure Spread Spectrum Watermarking for Multimedia," IEEE Trans. On Image Proc., vol. 6, No. 12, pp. 1673-1686, Dec. 1997.

D. Zheng, J. Zhao, and A. Saddik,"RST-Invariant Digital Image Watermarking Based on Log-Polar Mapping and Phase Correlation," IEEE Trans. On Circuits and Systems for Video Technology, vol. 13, No. 8, pp. 753-765, Sep. 2003.

S.A.M. Gilani and A.N. Skondras, "DLT-Based Digital Image Watermarking," First IEEE Balkan Conference on Signal Process, Communications, Circuits and Systems, Jun. 2-3, 2000, Istanbul, Turkey.

S. Pereira,J.K.K. O'Ruanaidh, F. Deguillaume, G. Csurka, and T. Pun, "Template Based Recovery of Fourier Based Watermarks Using Log- Polar and Log-Log Maps," IEEE International Conference on Multimedia Computing and Systems, Jun. 1999.

S. Pereira and T. Pun, "Robust Template Matching for Affine Resistant Image Watermarks," IEEE Trans. on Image Processing, vol. 9, No. 6, pp. 1123-1129, Jun. 2000.

C.S. Lu, "Block DCT-Based Robust Watermarking Using Side Information Extracted By Mean Filtering," Sixteenth International Conference on Pattern Recognition, Aug. 2002.

P.Bas, J.M. Chassery and B. Macq, "Geometrically Invariant Watermarking Using Feature Points," IEEE Trans. on Imaging Processing, Sep. 2002.

C.Y. Lin, et al., "Rotation, Scale, and Translation Resilient Public Watermarking for Images," IEEE Trans. on Image Processing, May 2001.

J. Hartung, K. Su, and B. Girod, "Spread Spectrum Watermarking: Malicious Attacks and Counterattacks," Proc. of SPIE, vol. 3657, Jan. 1999.

F.A.P. Petitcolas, R.J. Anderson, and M.G. Kuhn, "Attacks on Copyright Marking Systems," Information Hiding: Second International Workshop, Portland, Oregon, Apr. 15-17, 1998.

M. Alghoniemey and A.H. Tewfik, "Progressive Quantized Projection Watermarking Scheme," Proc. ACM Multimedia 1999, Orlando, FL, Nov. 2-5, 1999, pp. 295-298.

V. Fotopoulos and A.N. Skondras, "A Subband DCT Approach to Image Watermarking," X European Signal Processing Conference, Tampere, Finland, Sep. 4-8, 2000.

M. Alghoniemey and A.H. Tewfik, "Geometric Distortion Correction in Image Watermarking," Proc. SPIE vol. 3971, pp. 82-89, May 2000.

G. Langelaar and I. Setyawan, "Watermarking Digital Image and Video Data," IEEE Signal Processing Magazine, vol. 17, pp. 20-43, Sep. 2000.

R.C. Gonzalez and R.E. Woods, "Digital Image Processing," Upper Saddle River, New Jersey, Prentice Hall, Inc., 2002, pp. 472-477.

International Preliminary Report on Patentability ("IPRP") issued in connection with related International Patent Application No. PCT/US2005/02840.

* cited by examiner

ROBUST HIDDEN DATA EXTRACTION METHOD FOR SCALING ATTACKS

CROSS-REFERENCE TO RELATED APPLICATIONS

This application claims the benefit of U.S. provisional patent application No. 60/600,578 filed Aug. 11, 2004, the disclosure of which is incorporated herein by reference in its entirety.

GOVERNMENT INTERESTS

This invention was made with Government support under Agreement F30602-03-2-0044 awarded by the Air Force. The Government has certain rights in this invention.

FIELD OF THE INVENTION

The present invention relates to digital imaging and, more particularly, to a method for extracting hidden data embedded in a larger collection of digital data, e.g., a digital image.

BACKGROUND OF THE INVENTION

With the growth of multimedia systems in distributed environments, issues such as copy control, illegal distribution, copyright protection, covert communications, etc., have become important. Digital data hiding schemes have been proposed in recent years as a viable way of addressing some of these security concerns. Digital data hiding is one aspect of the larger field of steganography, which is concerned with the hiding of one media type within another, such as text, voice, or another image into an image or video. The potential customers having the greatest interest in steganography, particularly digital data hiding, include the entertainment industry, where digital data hiding would be used for copyright protection and electronic fingerprinting, and defense agencies, where digital data hiding would be used for covert communications and authentication of documents.

In conventional watermarking of paper documents, an ink-based image is embedded in the larger document. When authenticating the document, holding the document up to a light source reveals the faint traces of the watermark, which may or may not be visible under normal lighting conditions. For the entertainment or defense industries, it becomes increasingly important not to allow digital hidden data (e.g., a digital watermark) to be easily visible in a stego-image (a digital image with hidden data). Thus, one important property of a good digital data hiding technique is to keep the distortion of a host image (the original image) to a minimum. The digital hidden data must also be relatively immune to both intentional and unintentional attacks by those for whom the hidden data was not intended, such as counterfeiters and computer hackers. Some examples of attacks include digital-to-analog conversion, analog-to-digital conversion, requantization, dithering, rotation, scaling, and cropping. One of these types of attacks, scaling, is particularly insidious because of its ability to cause minimal perceptible differences between the original and the attacked overall image yet cause severe loss of the hidden data.

Scaling attacks generally refer to the reduction or expansion in the size of a stego-image, and come in two categories as is known in the art:

Category 1—The scaled image is the same size as the stego-image. This means a down-scaling operation is followed by an up-scaling operation or vice versa.

Category 2—The scaled image is not the same size as the stego-image (either up-scaled or down-scaled).

Probably the most common category of data hiding techniques used against both Category 1 and Category 2 attacks are based on the discrete cosine transform (DCT), as is known in the art. The 2D-DCT (2-dimensional DCT) data hiding technique used most often, and virtually a standard, is that described in J. R. Hernandez et al., "DCT-Domain Watermarking Techniques for Still Images: Detector Performance Analysis and a New Structure," IEEE Transactions on Image Processing, January 2000, Vol. 9, pp. 55-68 (the generic data hiding and hidden data extraction methods). In this scheme, 8×8 pixel blocks of the host image are first transformed using the 2D-DCT, and the mid-frequency regions of the 2D-DCT coefficient blocks are the locations where the hidden data is embedded. By using the mid-frequency regions for data hiding, the hidden data causes fewer distortions to the stego-image as compared to the low frequency regions, where most of the host image information is stored, while at the same time the hidden data would not be removed by compression schemes such as JPEG, where the high frequency regions of the 2D-DCT coefficients are thrown away.

At the encoder end, the real values of the hidden data representing the grey scale or color pixel amplitudes (in the range of 0-255) are converted to binary form. If the current bit from the hidden data is a '1', the '1' bit is replaced by a real-valued pseudo-random noise (PN) sequence. A second PN sequence represents the '0' bit. The two PN's are chosen to have minimal correlation with each other. The two PN's are known on both the encoding end and extracting end of the communications channel over which the stego-image is sent. The use of one PN representing an '0' and another representing a '1' minimizes the risk of misjudging a received '1' bit for an '0' bit and vice versa when the communication channel is noisy.

The mid-band 2D-DCT coefficients, represented as real-valued data, are modulated with one of the PN sequences according to the following equations:

$$I_w(u,v) = I(u,v) \times (1 + k_s \times W_b(u,v)), \; u,v \in F_M$$

$$I_w(u,v) = I(u,v), \; u,v \notin F_M$$

$W_b$ is either the PN sequence for '0', $W_0$, or the PN sequence for '1', $W_1$; $F_M$ is the set of the coefficients of the 2D-DCT matrix block corresponding to mid-band frequencies; $I(u,v)$ is an 8×8 2D-DCT block; $k_s$ is a gain factor used to specify the strength of the hidden data, and is adjusted according to the size of the particular 2D-DCT coefficient used (e.g., larger values of $k_s$ can be used for coefficients of higher magnitude and vice versa); and $I_W(u,v)$ represents the corresponding 2D-DCT block with hidden data. After all blocks of the host image have been processed, each block of the stego-image in the frequency domain is then inverse transformed to give the stego-image $I_W^*(x,y)$, where x is the distance from the upper left-hand corner of the image along the x-axis, and y is the distance from the upper left-hand corner of the image along the y-axis.

In the generic hidden data extraction method, to extract the hidden data at the other end of the communications channel, the received stego-image (which may or may not have been attacked) is broken down into 8×8 blocks, and a 2D-DCT transformation is performed. Then the correlation between the mid-band 2D-DCT coefficients, $I_W$ and both the PN's, $W_b$, are calculated, where $W_b$ is normalized to zero mean. If the correlation between the mid-band 2D-DCT coefficients and one of the PN sequences is higher than the other, then $H_i$, the $i^{th}$ reconstructed hidden data bit, is chosen according to the relation:

$$H_i=1, \text{corr}(I_w, W_1) > \text{corr}(I_w, W_0)$$

$$H_i=0, \text{otherwise}$$

where corr( ) is the discrete correlation function. One way the discrete correlation function is implemented, as is known in the art, is to use a Matlab™ function corr2(a, b). Given the argument C=corr2(a, b), Matlab™ takes in two sequences a and b and returns a real value C which is the correlation coefficient of a and b. This value is less than or equal to +1, with +1 being 100% correlation.

The formula and example below illustrate how the coefficient is calculated for a specific sequence.

Formula: $C = \text{sum}[\text{sum}(a'.*b')]/\text{sqrt}[\text{sum}\{\text{sum}(a'.*a')\}*\text{sum}\{\text{sum}(b'.*b')\}]$ Where, a'=a−mean(a)
b'=b−mean(b)
x.*y is the inner product of the vectors x and y The usage of this formula can be illustrated with the following steps:
a=[1, 0, 0, 0, 1, 1, 1, 0]
b=[0, 0, 1, 0, 1, 1, 1, 1]

Step 1:
mean(a)=(1+0+0+0+1+1+1+0)/8=0.5
mean(b)=(0+0+1+0+1+1+1+1)/8=0.625

Step 2:
a'=a−mean(a)=[0.5, −0.5, −0.5, −0.5, 0.5, 0.5, 0.5, −0.5]
b'=b−mean(b)=[−0.625, −0.625, 0.375, −0.625, 0.375, 0.375, 0.375, 0.375]

Step 3:
a'.*b=[−0.3125, 0.3125, −0.1875, 0.3125, 0.1875, 0.1875, 0.1875, −0.1875]
a'.*a=[0.25, 0.25, 0.25, 0.25, 0.25, 0.25, 0.25, 0.25]
b'.*b=[0.39062, 0.39062, 0.14062, 0.39062, 0.14062, 0.14062, 0.14062, 0.14062]

Step 4:
sum[sum(a'.*b')]=0.5
sum[sum(a'.*a')]=2.0
sum[sum(b'.*b')]=1.875

Step 5:
sum[sum(a'.*a')]*sum[sum(b'.*b')]=(2.0*1.875)=3.75

Step 6:
Sqrt(sum[sum(a'.*a')]*sum[sum(b'.*b')])=(2.0*1.875)
=1.936492

Step 7:
sum[sum(a'.*b')]/sqrt[sum{sum(a'.*a')}*sum{sum(b'.*b')}]
=0.5/1.93649=0.2582

The main problem with the generic extraction method is that it performs poorly against Category 2 attacks. Down-scaling the stego-image by a mere 4% or up-scaling it by a factor of 5% causes the generic extraction method to lose 50% of the hidden data. This is equivalent to just assuming all extracted bits are '1', and thus the extracted hidden data is unrecognizable.

The main cause of the loss of hidden data is that when the stego-image is scaled (i.e., resized), there will be fewer or greater 8×8 bocks of pixels to be examined in the attacked image compared to the un-scaled stego-image. If the scaled stego-image is partitioned into 8×8 blocks, then the spatial information in each block of the scaled stego-image is not the same as that in the corresponding block of the un-scaled stego-image. If the image size is reduced, then each 8×8 pixel block in the scaled image contains more hidden data information than the corresponding block of the un-scaled stego-image. As such, scaling destroys the one-to-one mapping between the blocks of the attacked image and the corresponding blocks in the un-scaled stego-image.

SUMMARY OF THE INVENTION

The present invention overcomes the disadvantages and shortcomings of the prior art discussed above by providing an enhanced method of extracting hidden data from a digital image, which includes the steps of receiving the digital image; determining a first number of blocks used to hide data in an original version of the digital image; computing an optimum block size for extracting the hidden data from the digital image based upon the first number of blocks; computing optimal locations in blocks of the digital image for extracting the hidden data therefrom; and extracting the hidden data from the optimal locations using the optimal block size. The method of the present invention can be applied to extract hidden data from both attacked and unattacked stego-images. In the case of an attacked stego-image, the method computes an optimum block size based on both the current size and the original size of the stego-image such that the number of blocks used for extracting the hidden data from the attacked stego-image remains the same as the number of blocks used to hide the hidden data in the original version of the stego-image.

The hidden data extraction method can be combined with any existing block-DCT based data hiding method to provide an overall method for dealing with scaling attacks. Further, the method of the present invention can be implemented in software and stored within a machine-readable medium or down-loaded over the Internet via a computer data signal embodied in a carrier wave. Moreover, the method of the present invention could be incorporated into a larger system for sending and receiving images having hidden data.

Further features and advantages of the invention will appear more clearly on a reading of the following detailed description of the exemplary embodiments of the invention, which are being provided by way of example only with reference to the accompanying drawings.

BRIEF DESCRIPTION OF THE DRAWINGS

For a more complete understanding of the present invention, reference is made to the following detailed description of the exemplary embodiments considered in conjunction with the accompanying drawings, in which.

DETAILED DESCRIPTION OF THE INVENTION

Figure 1A:
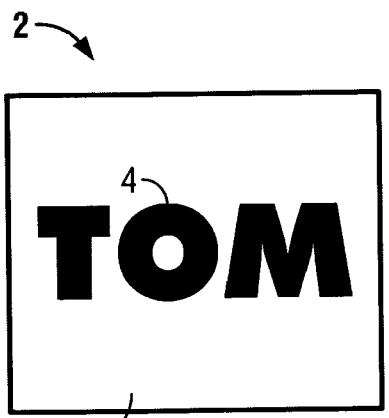
FIG. 1A is a view of data to be hidden in a digital image.

Referring now to FIGS. 1A-1F, there is shown visually how the enhanced hidden data extraction method (i.e., the hidden data extraction method of the first embodiment) of the present invention acts upon a scaled-down stego-image. In FIG. 1A, a digital representation of exemplary data to be hidden 2 is depicted, with the letters in the name "TOM" in uppercase letters. The letters of "TOM" are composed of digital grey-scale real numbers or pixels of dark areas 4 surrounded by light areas 6. Generally these pixels range in value from 0-255 encoded in binary representation in a computer. If the image 2 were in color, then the letters 4 and the background 6 would be represented by three sets of numbers for each pixel. The discussion of the foregoing enhanced extraction method of the present invention will consider the simpler case of a grey scale image, although the enhanced extraction method works equally well on a color image in which the same method is applied to three sets of blocks of numbers instead of one.

Figure 1B:
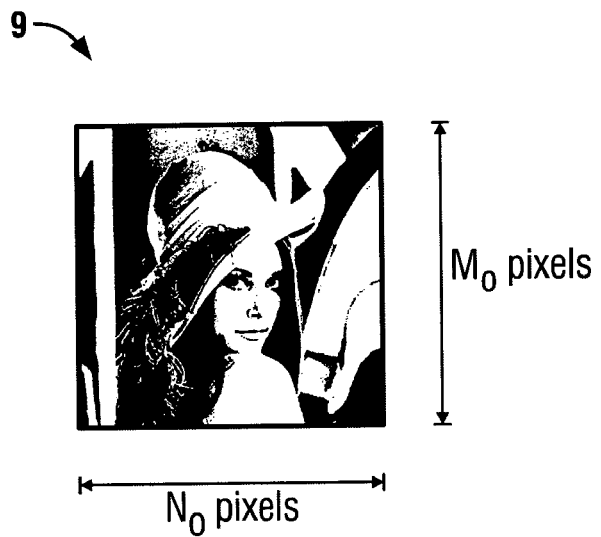
FIG. 1B is a view of a host image in which the data shown in FIG. 1A can be hidden to produce a stego-image.
Figure 1C:
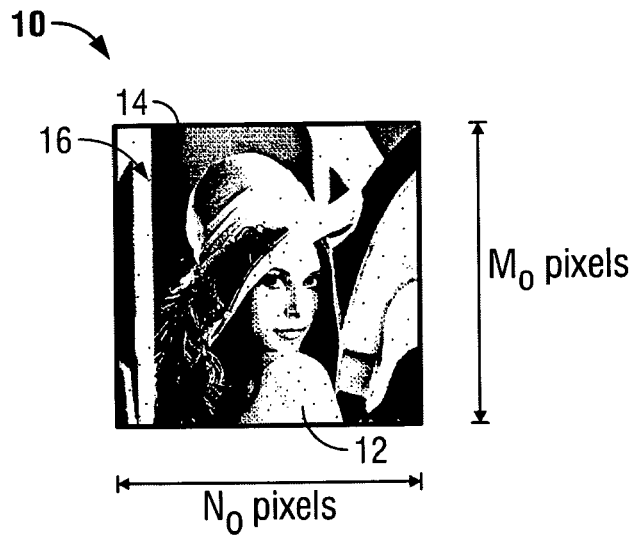
FIG. 1C is a view of the stego-image produced by hiding the data shown in FIG. 1A into the host image shown in FIG. 1B.

Now referring to FIGS. 1B and 1C, FIG. 1B is the original host image 9, while FIG. 1C is the stego-image 10 with data hidden according to the generic method (i.e., the prior art method). The stego-image 10 shows a person 12 surrounded by a background 14. The hidden data itself does not remain intact in the image 10, but is spread out or "hidden" over the entire stego-image 10, resulting in a small amount of distortion or stray pixels of dark areas or light areas 16. The stego-image 10 has pixel dimensions of $M_O \times N_O$, which represents the original size of the stego-image 10.

Figure 1D:
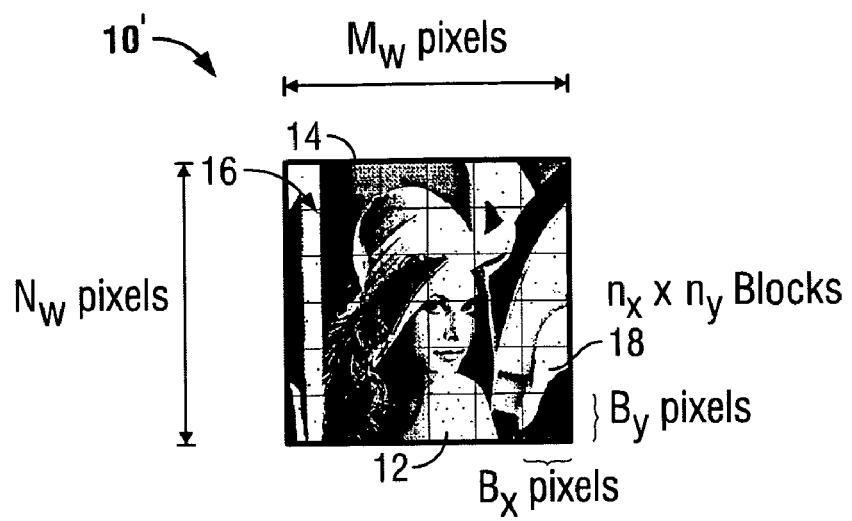
FIG. 1D is a diagram of a down-scaled version of the stego-image of FIG. 1C in which the image is divided in accordance with the present invention into an appropriate number of blocks for extracting hidden data.

FIG. 1D shows an attacked version 10' of the stego-image 10 shown in FIG. 1C, wherein the image 10' has been the subject of a scaling attack. When run through the enhanced extraction method of the present invention, the attacked stego-image 10', in this case reduced in size to $M_W$ pixels by $N_W$ pixels, is divided into $n_x \times n_y$ blocks 18 where $n_x$ is the number of columns and $n_y$ is the number of rows in the attacked image. Each of the blocks 18 represents a matrix of pixels of dimensions $B_x \times B_y$. The size $B_x \times B_y$ of the blocks 18 will vary proportionally to the ratio of the size of the attacked stego-image 10' to the original stego-image 10 such that the total number of blocks 18 used to extract data from the attacked version 10' of the stego-image 10 is the same as the number of blocks used to hide data into the stego-image 10.

Figure 1E:
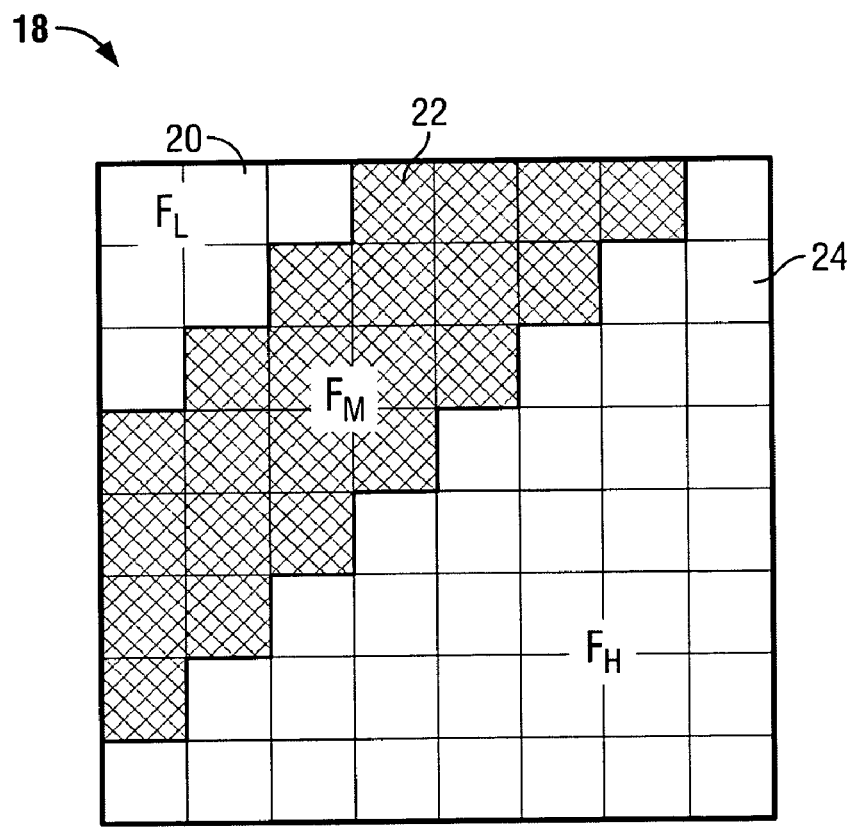
FIG. 1E is a block diagram showing the coefficients of the discrete cosine transformation along with the middle frequency coefficients used by the present invention to hide data in blocks of the stego-image of FIG. 1D.

With reference to FIG. 1E, during the processing of the attacked stego-image 10', each of the blocks 18 is transformed to the frequency domain using the discrete cosine transform (DCT), producing low frequency coefficients 20, mid-frequency coefficients 22, and high frequency coefficients 24. Each low frequency coefficient 20 contains most of host image's information, but does not contain any hidden data information. The hidden data information is stored in the mid-frequency coefficients 22, which distorts the stego-image only minimally. No hidden data information is stored in the upper frequency coefficients 24, since this region of the 2D-DCT-transformed image is most likely to be affected by data compression algorithms such as the JPEG standard, so little hidden data information is lost.

Figure 1F:
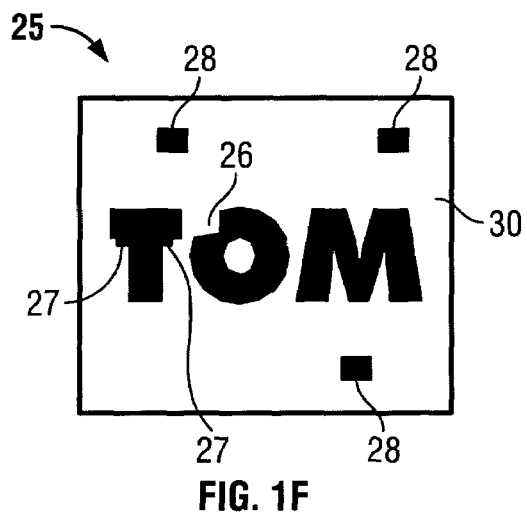
FIG. 1F shows the extracted hidden data derived from FIG. 1D after processing by the method of the present invention.

With reference to FIG. 1F, an extracted hidden data image 25 is reconstructed by the enhanced method of the present invention and contains data corresponding to the data 2 shown in FIG. 1A and embedded in the stego-image of FIG. 1C. There will be some degradation to the hidden data. For example, the letter 'O' shows a missing pixel 26, the letter 'T' shows extra dark pixels 27, and some stray dark pixels 28 appear in the background 30. However, this degradation is nominal, as the overall integrity of the hidden data image 25 is preserved.

Figure 2:
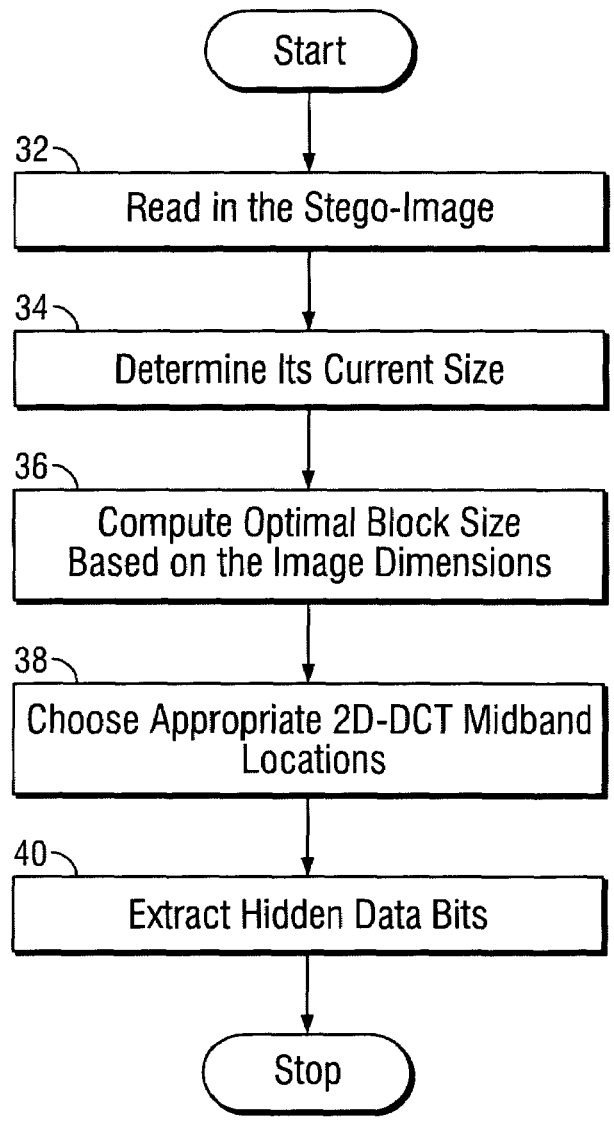
FIG. 2 is a flow chart showing the overall method of the present invention.

With reference to FIG. 2, a flow chart 31 of the basic steps of the enhanced method of the present invention is depicted. At step 32, the received stego-image, represented as real-valued digital data bits, is read into a buffer. By the term "received stego-image," it is meant a stego-image which has been transmitted through a communication channel and which may or may not have been attacked. By the term "original stego-image," it is meant a stego-image that includes hidden data and which has not yet been transmitted and/or subject to an attack. At step 34, the size of the received stego-image is determined. At step 36, the optimal block size is computed based on the image dimensions determined in step 34. At step 38, after 2D-DCT transforming an individual block of optimal block size, appropriate 2D-DCT mid-band locations 22 (see FIG. 1E) are selected for further processing. At step 40, the hidden data bits are extracted from the 2D-DCT mid-band locations 22. The processing shown in FIG. 2 can be repeated as necessary to process all blocks 18 of the received stego-image.

Figure 3:
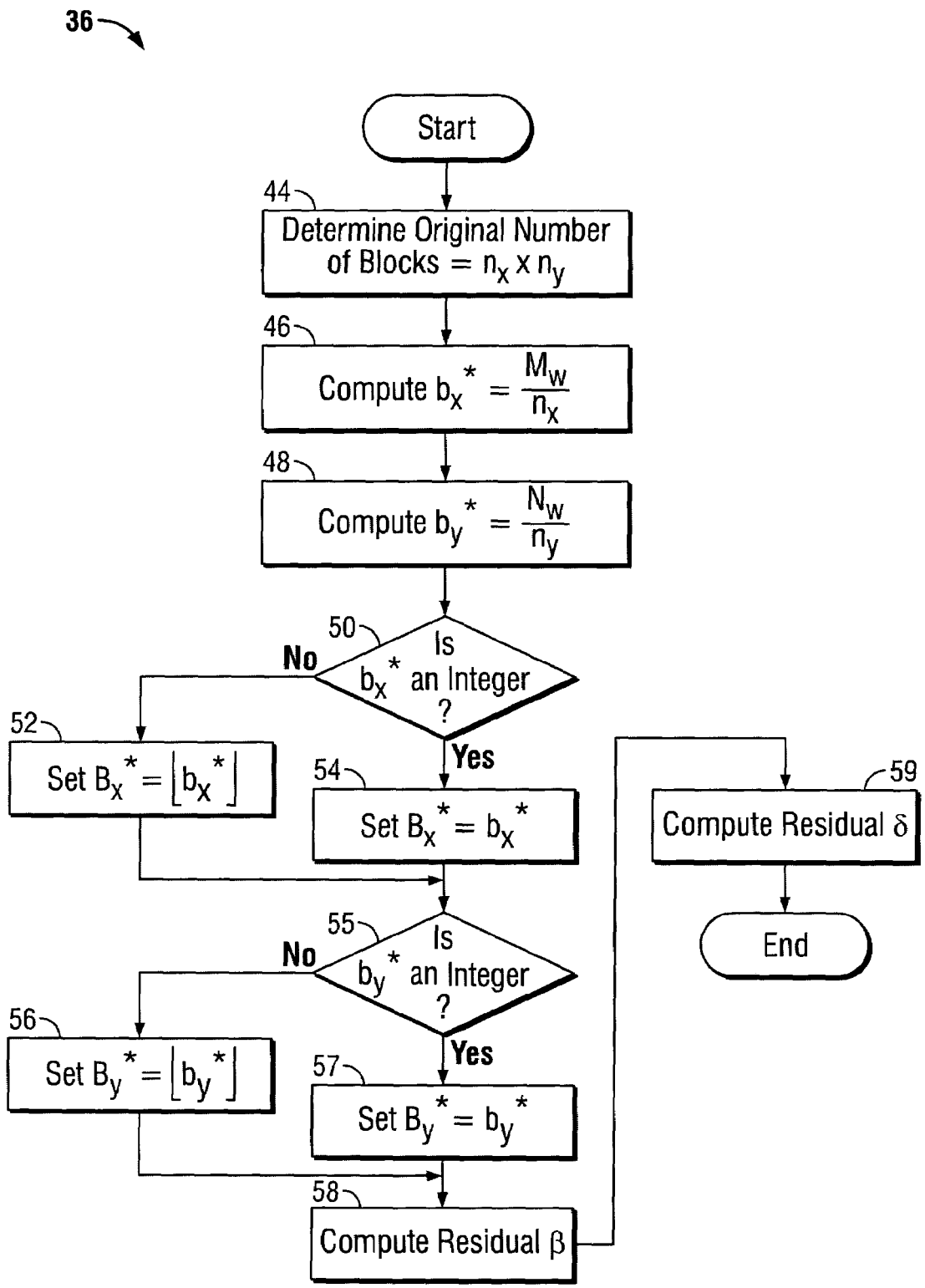
FIG. 3 is a flow chart showing the method of FIG. 2 in greater detail, wherein an optimal block size is computed based on the image dimensions.

With reference to FIG. 3, the step 36 of FIG. 2 of computing the optimal block size based on the image dimensions is expanded into sub-steps. At step 44, the number of blocks of the original stego-image image, $n_x \times n_y$, is determined, where $n_x$ is the number columns of blocks and $n_y$ is the number of rows of blocks. The number of columns of blocks, $n_x$, and the number of rows of blocks, $n_y$, can be determined from any one of the following information stored in the header of the received stego-image: (i) the values of $n_x$ and $n_y$, (ii) the ratio of $n_x$ to $n_y$ (or vice versa), or (iii) the dimensions, $M_O \times N_O$ pixels, of the original stego-image. Further, if the dimensions of the block size, a×b, used to encode the host image is known (e.g., the 8×8 pixels used in the J. R. Hernandez et al. 2D-DCT data hiding technique), then the number of blocks of the original stego-image image can be calculated as $$\frac{M_0}{a} \times \frac{N_0}{b}.$$

The received stego-image has dimensions $M_w \times N_w$. At step 46, a temporary variable, $b_x^*$ is calculated, equal to $M_w$ pixels divided by $n_x$ blocks. Likewise, at step 48, a temporary variable, $b_y^*$ is calculated, equal to $N_w$ pixels divided by $n_y$ blocks. At step 50, the question is asked whether the value of $b_x^*$ is an integer. If it is not, then step 52 occurs, wherein the quantity $B_x^*$, representing the x dimension size of a block to be used in the enhanced extraction method of the present invention, is calculated from the floor function operating on $b_x^*$ (the floor function being the truncated value of a real number, or the decimal part without the fraction beyond the decimal). If $b_x^*$ is an integer, then at step 54, $B_x^*$ is set to $b_x^*$. Likewise, at step 55, the question is asked whether the value of $b_y^*$ is an integer. If it is not, then step 56 occurs, wherein the quantity $B_y^*$, representing the y dimension size of a block to be used in the enhanced extraction method of the present invention, is calculated from the floor function operating on $b_y^*$. If $b_y^*$ is an integer, then at step 57, $B_y^*$ is set to $b_y^*$. At step 58, the residual in the x direction, β, is computed, where β is defined as:

$$\beta = M_W - (\lfloor B_x^* \rfloor * n_x)$$

Finally, at step 59, the residual in the y direction δ is computed, where δ is defined as:

$$\delta = M_W - (\lfloor B_y^* \rfloor * n_y)$$

As an example, if the original stego-image had overall dimensions $M_0 \times N_0$ of 1024×1024 pixels and the received stego-image was down-scaled to dimensions $M_w \times N_w$ of 512×512 pixels, then the original number of blocks, $n_x \times n_y$, assuming an 8×8 block size, is $M_0/8 \times N_0/8 = 1024/8 \times 1024/8 = 128 \times 128 = 16384$ blocks. The block size to be used to extract the hidden data from the received stego-image using the enhanced method is no longer 8×8, but $$B_x^* = \lfloor b_x^* \rfloor = \left\lfloor \frac{M_W}{n_x} \right\rfloor = \left\lfloor \frac{512}{128} \right\rfloor = 4,$$

$$B_y^* = \lfloor b_y^* \rfloor = \left\lfloor \frac{N_W}{n_y} \right\rfloor = \left\lfloor \frac{512}{128} \right\rfloor = 4$$

for a 4×4 block size. The residuals β and δ would be $$\beta = M_W - (\lfloor B_x^* \rfloor * n_x) = 512 - (\lfloor 4 \rfloor * 128) = 0, \delta = 512 - (\lfloor 4 \rfloor * 128) = 0,$$

As another example, if the original stego-image had overall dimensions $M_0 \times N_0$ of 1024×1024 pixels and the received stego-image was up-scaled to dimensions $M_w \times N_w$ of 2048×2048 pixels, then the original number of blocks is $M_0/n_x \times N_0/n_y = 1024/8 \times 1024/8 = 128 \times 128 = 16384$ blocks so the block size to be used to extract the hidden data from the received stego-image using the enhanced method is no longer 8×8, but $$B_x^* = \lfloor b_x^* \rfloor = \left\lfloor \frac{M_W}{n_x} \right\rfloor = \left\lfloor \frac{2048}{128} \right\rfloor = 16,$$

$$B_y^* = \lfloor b_y^* \rfloor = \left\lfloor \frac{N_W}{n_y} \right\rfloor = \left\lfloor \frac{2048}{128} \right\rfloor = 16$$

for a 16×16 block size. The residuals β and δ would be $$\beta = M_W - (\lfloor B_x^* \rfloor * n_x) = 2048 - (\lfloor 16 \rfloor * 128) = 0, \delta = 2048 - (\lfloor 16 \rfloor * 128) = 0,$$

Figure 4:
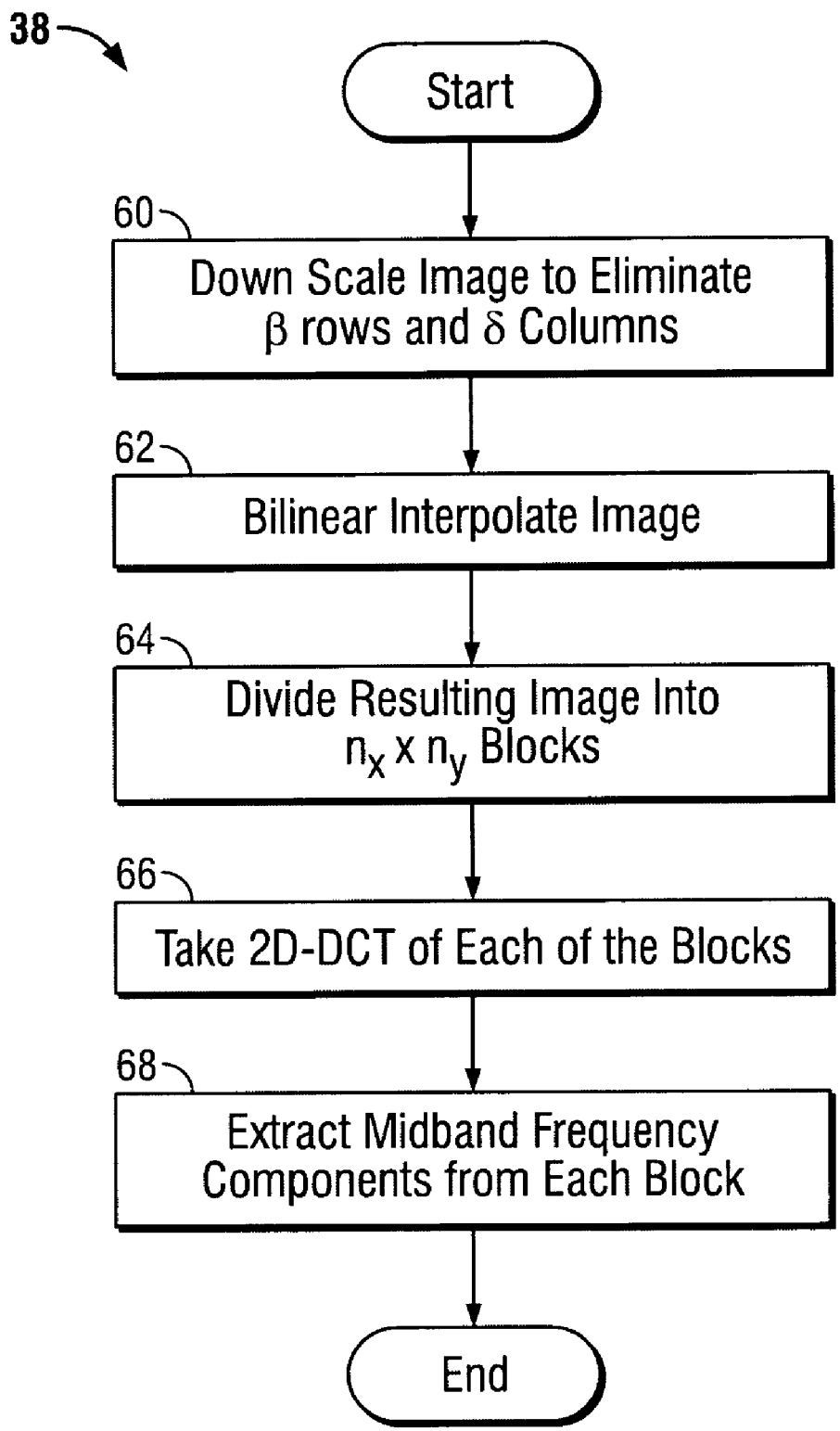
FIG. 4 is a flow chart showing the method of FIG. 2 in greater detail, wherein appropriate 2D-DCT mid-band locations are chosen and δ rows and β columns are eliminated.

Now referring to FIG. 4, the step 38 of choosing the appropriate 2D-DCT mid-band locations is expanded into sub-steps. At step 60, the received stego-image image is down-scaled to eliminate β rows and δ columns. At step 62, the image is bilinear-interpolated. At step 64, the resulting image from steps 62 and 64 is divided into $n_x \times n_y$ blocks. At step 66, the 2D-DCT is taken for each block. At step 68, the mid-band frequency components from each block are extracted.

Figure 5:
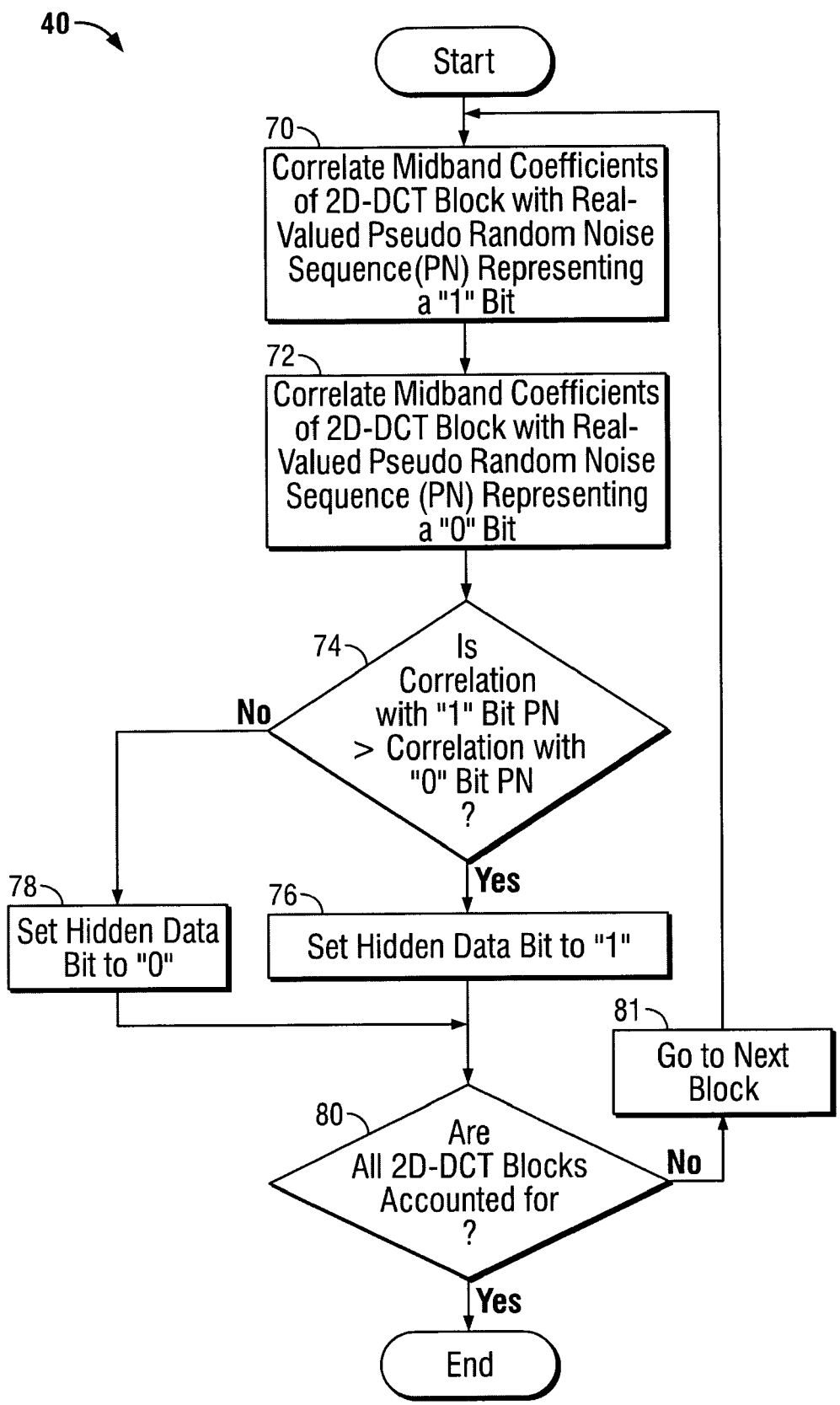
FIG. 5 is a flow chart showing the method of FIG. 2 in greater detail, wherein hidden data bits are extracted.

Now referring to FIG. 5, the step 40 of extracting the hidden data bits is expanded into sub-steps. At step 70, the mid-band coefficients of a 2D-DCT block matrix are correlated with the known PN sequence representing a '1' bit. At step 72, the same mid-band coefficients of the same 2D-DCT block matrix are correlated with the known PN sequence representing an '0' bit. At step 74, the correlation of step 70 is compared with that of step 72. If the value of correlation with the PN sequence representing a '1' bit is greater than that of the PN sequence representing a '0' bit, then at step 76, the hidden data bit is set to '1', otherwise, the hidden data bit is set to '0' at step 78. At step 80, if all the 2D-DCT blocks have been examined, then the hidden data has been completely extracted, otherwise, processing continues with step 81 at the next block.

Figure 6:
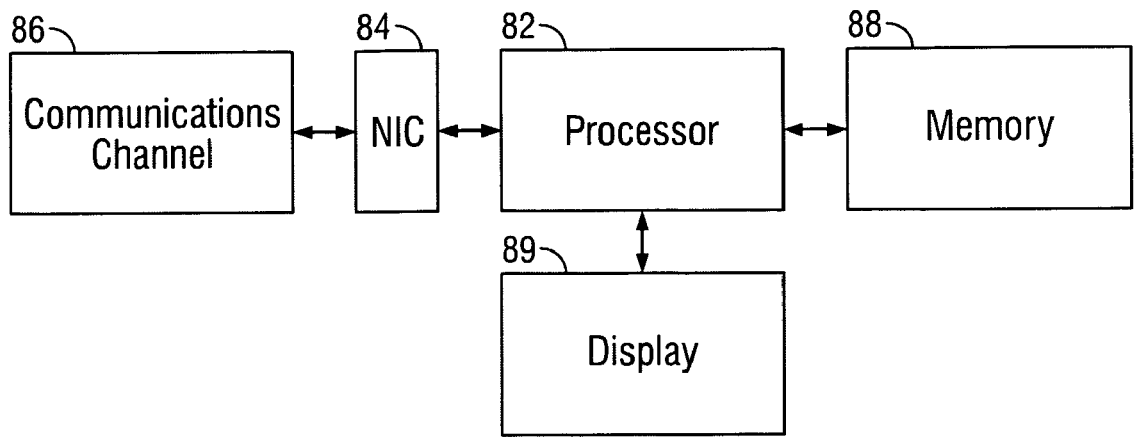
FIG. 6 is a block diagram of an apparatus capable of employing the method of FIG. 2.

With reference to FIG. 6, an apparatus implementing the enhanced hidden data extraction method of the present invention is depicted. A processor 82 reads in the received stego-image from communications channel 84 via a network interface card 86 (NIC) and stores the image in memory 88. Communications channel 84 is often a local area network or the Internet, so that NIC 86 can be an Ethernet Card. In wireless communications, the communication channel 84 is airspace and the NIC 86 is a WiFi or Bluetooth transceiver. In still other applications, communications channel 84 is a telecommunication network and NIC 86 is a dial-up modem. Processor 82 can reside within an embedded system, a personal computer, work station, a minicomputer, or a main frame. For example, a suitable processor could include a Sun SPARCstation™ 60 having 512 megabytes of memory, running the Solaris™ operating system. Memory 88 can be a combination of random access memory and/or a machine-readable medium, such as a hard disk. Memory 88 is used for storing and the data received from the communication channel 84 and for storing the enhanced hidden data extraction program of the present invention. After processor 82 operates on the image and extracts the hidden data, the hidden data can be shown on a display 89 such as a monitor, stored back in memory 88, or sent back over communication channel 84 via NIC 86. The method of the present invention could be carried out using software written in any suitable high or low level language, and stored in executable object code in the memory 88.

Figure 7:
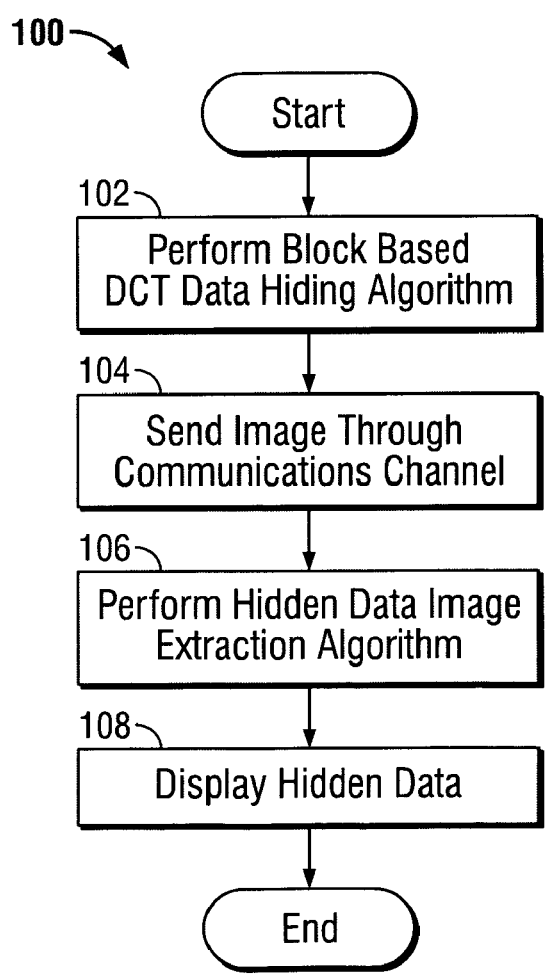
FIG. 7 is flow chart of another embodiment of the present invention wherein the extraction method is incorporated into a system for sending and receiving data across a communications channel.

FIG. 7 is a flow chart showing another embodiment of the present invention, indicated generally at 100. In this embodiment, the extraction method of the present invention is incorporated into a system for sending and receiving data across any suitable communications channel. In step 102, a generic, block-based 2D-DCT data hiding algorithm is performed on a host image in a memory (e.g., an image stored in memory 88 of FIG. 6) to produce a stego-image. This stego-image is sent out through a communications channel via a processor and a NIC at step 104 (using, for example, the components shown in FIG. 6). The stego-image is then received over the communications channel and stored in memory. The processor then performs the enhanced hidden data extraction method of the present invention. Finally, at step 108, the extracted hidden data is presented on a display.

One advantage of the enhanced hidden data extraction method over the generic method is performance. To gauge the performance of the enhanced hidden data extraction method of the present invention over the generic method, reference is made to FIGS. 8-11. FIGS. 8-11 summarize the results obtained after Category-1 and Category-2 scaling attacks on three stego-images having sizes of 512×512 pixels. Random bit sequences ranging in size from 8000 to 14400 bits were used as hidden data.

Figure 8:
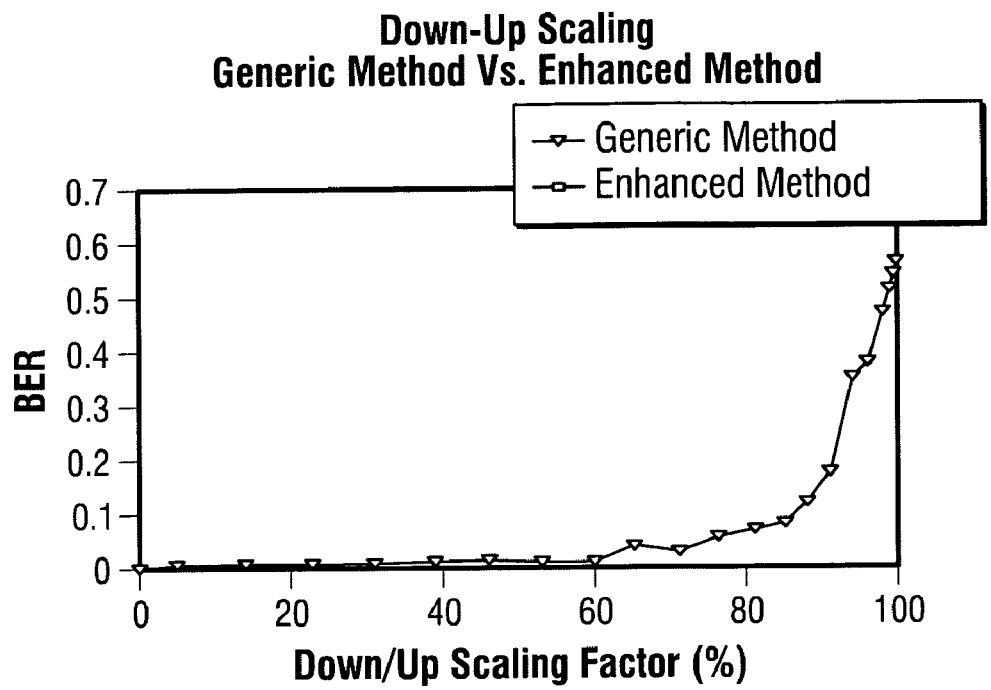
FIG. 8 is a graph of bit error rates (BER) versus scaling factors, comparing the performance of the hidden data extraction method of the present invention to the generic method for a Category-1 Down-Scaling attack.

Referring now to FIG. 8, a graph of bit error rates (BER) versus scaling factors is depicted for the case of a Category-1 Down-Scaling attack. The enhanced method (i.e., the hidden data extraction method of both disclosed embodiments) of the present invention and the generic (i.e., the prior art) method performed equally well, so that for a down-scaling factor of 85%, both methods retrieve about 90% of the embedded hidden data correctly (what is meant by a recovery rate of 90% is that the Bit Error Rate (BER) was about 0.1, or 100 errors per 1000 bits of hidden data).

Figure 9:
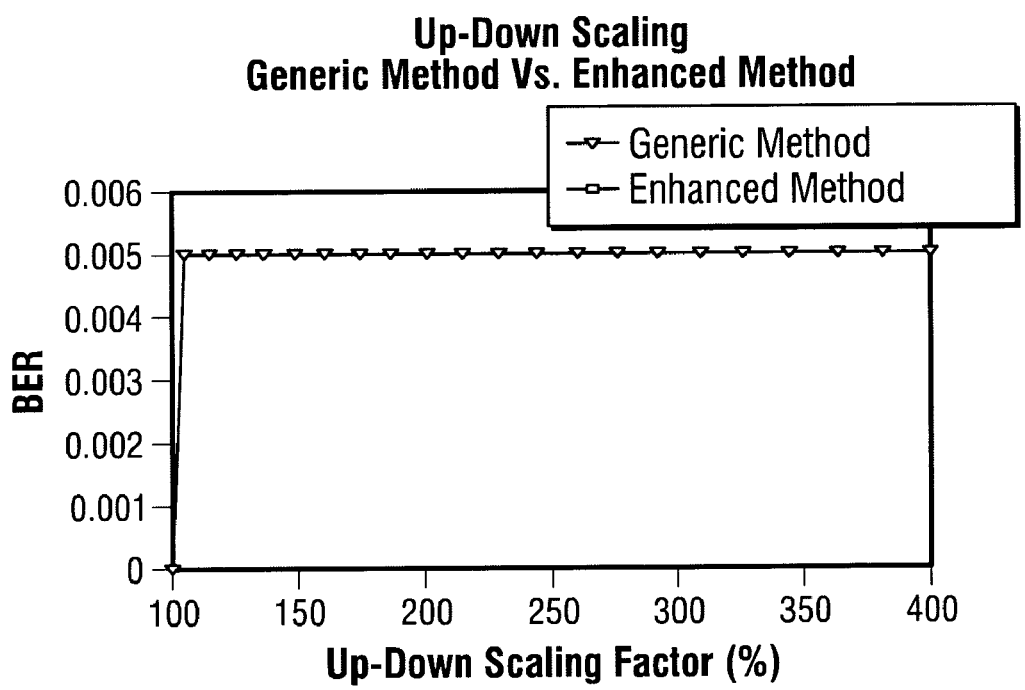
FIG. 9 is a graph of bit error rates (BER) versus scaling factors, comparing the performance of the hidden data extraction method of the present invention to the generic method for a Category-1 Up-Scaling attack.

Referring now to FIG. 9, a graph of bit error rates (BER) versus scaling factors is depicted for the case of a Category-1 Up-Scaling attack. The enhanced method of the present invention and the generic method performed equally well, so that for a down-scaling factor of 85%, both methods retrieve about 99.4% of the embedded hidden data correctly for a BER of about 0.005, or 5 errors per 1000 bits of hidden data.

Figure 10:
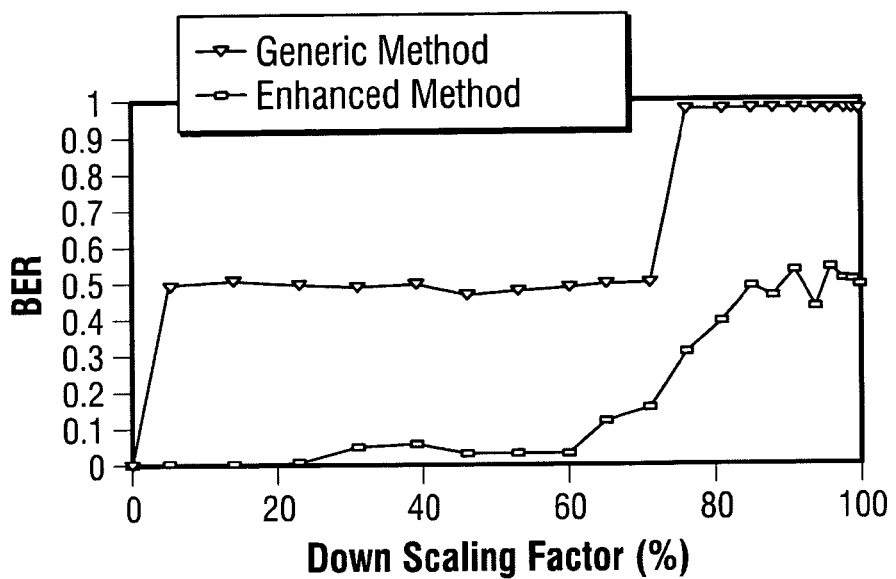
FIG. 10 is a graph of bit error rates (BER) versus scaling factors, comparing the performance of the hidden data extraction method of the present invention to the generic method for a Category-2 Down-Scaling attack.

Referring now to FIG. 10, a graph of bit error rates (BER) versus scaling factors is depicted for the case of a Category-2 Down-Scaling attack. The enhanced method of the present invention far out-performs the generic method for all cases of down-scaling between 6% and 100%. Down-scaling the stego-image with the generic method by a mere 4% causes the generic method to loose 50% of the hidden data. At this percentage of down-scaling, the enhanced method of the present invention has a near 0% error, and even a 66% down-scaling causes a 0.11 BER for a recovery rate of 89%.

Figure 11:
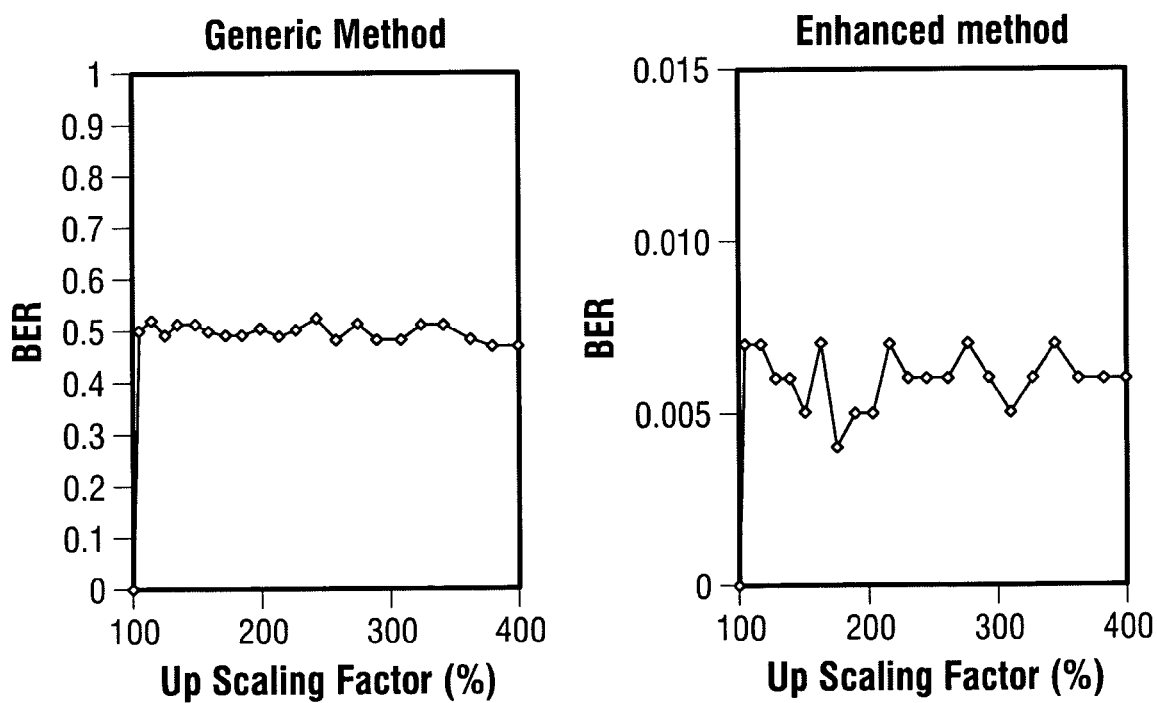
FIG. 11 shows graphs of bit error rates (BER) versus scaling factors, comparing the performance of the hidden data extraction method of the present invention to the generic method for a Category-2 Up-Scaling attack.

Referring now to FIG. 11, graphs of bit error rates (BER) versus scaling factors are depicted for the case of a Category-2 Up-Scaling attack. The enhanced method of the first embodiment of the present invention, shown in the graph to the right, far out-performs the generic method, shown in the graph to the left, for all cases of up-scaling between 100% and 400%. Up-scaling the stego-image with the generic method in nearly all up-scaling attacks resulted in a 50% recovery rate, while the enhanced method of the present invention had a BER no greater than 0.007 for a recovery rate of 99.3%.

The performance of the enhanced method of the present invention compared to the generic method using a combination of attacks is summarized in Table 1, below. Here, the stego-image was subjected to several other popular attacks known in the art before down-scaling the stego-image by a factor of 50%. In all cases, the enhanced method of the present invention fared better than the generic method.

TABLE 1

PERFORMANCE RESULTS FOR COMBINATION ATTACKS

| Test | BER for the Method of the Present Invention | BER for the Generic Method |
| --- | --- | --- |
| JPEG (Q.90) | 0.057 | 0.667 |
| JPEG (Q-50) | 0.059 | 0.685 |
| JPEG (Q-20) | 0.066 | 0.694 |
| Sharpening | 0.086 | 0.658 |
| Despeckle | 0.095 | 0.631 |
| Smart Blur (Rad. 5) | 0.104 | 0.730 |
| Median Filtering | 0.154 | 0.676 |
| Uniform Noise (10%) | 0.229 | 0.775 |
| Uniform Noise (15%) | 0.285 | 0.793 |
| Gaussian Noise (10%) | 0.301 | 0.820 |
| Gaussian Noise (15%) | 0.325 | 0.856 |
| Motion Blur (5°) | 0.362 | 0.802 |

An advantage of the enhanced method over other hidden data extraction methods is its minimal computational complexity. Only two additional divisions are needed compared to the generic method.

It will be understood that the embodiments described herein are merely exemplary and that a person skilled in the art may make many variations and modifications without departing from the spirit and scope of the invention. All such variations and modifications are intended to be included within the scope of the present invention as defined in the appended claims.

What is claimed is:

1. A method of extracting hidden data from a received stego-image, comprising the steps of:
   receiving the stego-image;
   determining a first number of blocks used to hide data in an original version of the stego-image;
   computing, by a processor, an optimum block size for extracting the hidden data from the received stego-image based upon said first number of blocks;
   computing, by said processor, optimal locations in said first number of blocks of said received stego-image for extracting data therefrom; and
   extracting, by said processor, the hidden data from said optimal locations using said optimum block size,
   wherein said step of computing an optimum block size further includes the steps of:
   determining the current pixel dimensions $M_w \times N_w$ of the received stego-image;
   calculating a first temporary variable $b_x^*$, wherein $$b_x^* = \frac{M_W}{n_x};$$

calculating a second temporary variable $b_y^*$, wherein $$b_y^* = \frac{N_W}{n_y};$$

calculating a first floor value $B_x^*$, wherein $B_x^* = b_x^*$ when $b_x^*$ is an integer and $B_x^* = \lfloor b_x^* \rfloor$ when $b_x^*$ contains a fractional component;

calculating a second floor value $B_y^*$, wherein $B_y^* = b_y^*$ when $b_y^*$ is an integer and $B_y^* = \lfloor b_y^* \rfloor$ when $b_y^*$ contains a fractional component; and setting dimensions of said optimum block size to $B_x^* \times B_y^*$.

2. The method of claim 1, wherein said step of extracting the hidden data further includes the step of extracting the hidden data from a second number of blocks in said received stego-image, said second number of blocks being equal to said first number of blocks.

3. The method of claim 2, wherein said step of determining said first number of blocks used to hide data further includes the step of determining a number of blocks divided into $n_x$ rows by $n_y$ columns of blocks of an original stego-image.

4. The method of claim 2, further comprising the step of reading an original stego-image size from a header.

5. The method of claim 1, wherein said step of computing an optimum block size further includes the step of calculating a residual row value $\beta$ and a residual column value $\delta$, wherein $\beta = M_w - (\lfloor B_x^* \rfloor * n_x)$ and $\delta = N_w - (\lfloor B_y^* \rfloor * n_y)$.

6. The method of claim 5, wherein said step of determining optimal locations for extracting the hidden data from said received stego-image further includes the steps of:

down sealing said received stego-image by eliminating $\beta$ rows of blocks and $\delta$ columns of blocks;

bilinear interpolating said received stego-image to produce an intermediate image;

dividing said intermediate image into $n_x \times n_y$ blocks using said optimum block size;

calculating a 2-Dimensional Discrete Cosine Transform (2D-DCT) for each of said $n_x \times n_y$ blocks to produce a set of transformed blocks; and determining mid-band frequency coefficients for each block of said set of transformed blocks.

7. The method of claim 6, wherein said step of extracting the hidden data from said received stego-image using said optimum block size further includes the steps of:

(a) correlating said mid-band frequency coefficients of one block of said set of transformed blocks with a first pseudo random noise (PN) sequence representing a "1" bit to produce a first correlation value;

(b) correlating said mid-band frequency coefficients of said block with a second pseudo random noise (PN) sequence representing a "0" bit to produce a second correlation value;

(c) setting a hidden data bit to "1" when said first correlation value is greater than or equal to said second correlation value;

(d) setting a hidden data bit to "1" when said first correlation value is less than or equal to said second correlation value; and (e) repeating steps (a)-(d) until all blocks in said set of transformed blocks have been processed.

8. The method of claim 7, wherein steps (a) and (b) are performed using a discrete correlation function.

9. The method of claim 1, further comprising the steps of hiding the data in a host image to produce an original stego-image by applying a block based DCT data hiding algorithm to said host image and transmitting said original stego-image through a communications channel before said step of receiving said digital image.

10. A computer-readable medium carrying one or more sequences of instructions for extracting hidden data from a received stego-image, wherein execution of the one of more sequences of instructions by one or more processors causes the one or more processors to perform the steps of:

receiving the stego-image;

determining a first number of blocks used to hide data in an original version of the stego-image;

computing an optimum block size for extracting the hidden data from the received stego-image based upon said first number of blocks;

computing optimal locations in said first number of blocks of the received stego-image for extracting data therefrom; and extracting the hidden data from said optimal locations using said optimum block size, wherein the step of determining said first number of blocks used to hide data further includes the step of calculating $n_x$ rows by $n_y$ columns of blocks by dividing a known original block size of $a \times b$ pixels into an original stego-image size of dimensions $M_0 \times N_0$ pixels, and wherein the step of extracting the hidden data further includes the step of extracting the hidden data from a second number of blocks in said received stego-image, said second number of blocks being equal to said first number of blocks.

11. The computer-readable medium of claim 10, wherein said step of determining said first number of blocks used to hide data further includes the step of determining a number of blocks divided into $n_x$ rows by $n_y$ columns of blocks of an original stego-image.

12. The computer-readable medium of claim 10, further comprising the steps of biding the data in a host image to produce an original stego-image by applying a block based DCT data hiding algorithm to said host image and transmitting said original stego-image through a communications channel before said step of receiving the digital image.

13. A method of extracting hidden data from a stego-image, which is a digital image that contains the hidden data and that has dimensions of $M_0 \times N_0$ pixels, the method comprising the steps of:

determining a first number of blocks previously used to hide the hidden data in the stego-image, said first number of blocks represented by $n_x$ rows by $n_y$ columns of blocks and calculated by dividing a known original block size of $a \times b$ pixels into the dimensions of the stego-image;

computing, by a processor, an optimum block size for extracting the hidden data from the stego-image based upon said first number of blocks;

computing, by said processor, optimal locations within said first number of blocks for extracting the hidden data therefrom; and extracting, by said processor, the hidden data from said optimal locations using said optimum block size, wherein the step of extracting the hidden data further includes the step of extracting the hidden data from a second number of blocks in said stego-image, said second number of blocks being equal to said first number of blocks.

14. The method of claim 13, further comprising the step of reading the stego-image dimensions from a header.

15. The method of claim 14, wherein said step of computing an optimum block size further includes the steps of:

determining current pixel dimensions $M_w \times N_w$ of the stego-image;

calculating a first temporary variable $b_x^*$, wherein $$b_x^* = \frac{M_W}{n_x};$$

calculating a second temporary variable $b_y^*$, wherein $$b_y^* = \frac{N_W}{n_y};$$

calculating a first floor value $B_x^*$, wherein $B_x^*=b_x^*$ when $b_x^*$ is an integer and $B_x^*=\lfloor b_x^* \rfloor$ when $b_x^*$ contains a fractional component;

calculating a second floor value $B_y^*$, wherein $B_y^*=b_y^*$ when $b_y^*$ is an integer and $B_y^*=\lfloor b_y^* \rfloor$ when $b_y^*$ contains a fractional component; and setting dimensions of said optimum block size to $B_x^* \times B_y^*$.

16. The method of claim 15, wherein said step of computing an optimum block size further includes the step of calculating a residual row value β and a residual column value δ, wherein $β=M_w-(\lfloor B_x^* \rfloor *n_x)$ and $δ=N_w-(\lfloor B_y^* \rfloor *n_y)$.

17. The method of claim 16, wherein said step of determining optimal locations for extracting the hidden data from said stego-image further includes the steps of:

down scaling said stego-image by eliminating β rows of blocks and δ columns of blocks;

bilinear interpolating said stego-image to produce an intermediate image;

dividing said intermediate image into $n_x \times n_y$ blocks using said optimum block size;

calculating a 2-Dimensional Discrete Cosine Transform (2D-DCT) for each of said $n_x \times n_y$ blocks to produce a set of transformed blocks; and determining mid-band frequency coefficients for each block of said set of transformed blocks.

18. The method of claim 17, wherein said step of extracting the hidden data from the stego-image using said optimum block size further includes the steps of:

(a) correlating said mid-band frequency coefficients of one block of said set of transformed blocks with a first pseudo random noise (PN) sequence representing a "1" bit to produce a first correlation value;

(b) correlating said mid-band frequency coefficients of said block with a second pseudo random noise (PN) sequence representing a "0" bit to produce a second correlation value;

(c) setting a hidden data bit to "1" when said first correlation value is greater than or equal to said second correlation value;

(d) setting a hidden data bit to "1" when said first correlation value is less than or equal to said second correlation value; and (e) repeating steps (a)-(d) until all blocks in said set of transformed blocks have been processed.

19. The method of claim 18, wherein steps (a) and (b) are performed using a discrete correlation function.

* * * * *